United States Patent
Munk et al.

(10) Patent No.: US 10,065,609 B2
(45) Date of Patent: Sep. 4, 2018

(54) WASHER NOZZLE FOR WINDSHIELD WASHER SYSTEM OF A MOTOR VEHICLE

(71) Applicant: Continental Automotive GmbH, Hannover (DE)

(72) Inventors: Winfried Munk, Melsungen (DE); Andreas Rehs, Rotenburg (DE); Heiko Weitzel, Schenklengsfeld-Hilmes (DE)

(73) Assignee: Continental Automotive GmbH (DE)

( * ) Notice: Subject to any disclaimer, the term of this patent is extended or adjusted under 35 U.S.C. 154(b) by 252 days.

(21) Appl. No.: 14/307,862

(22) Filed: Jun. 18, 2014

(65) Prior Publication Data
US 2014/0374505 A1 Dec. 25, 2014

(30) Foreign Application Priority Data
Jun. 21, 2013 (DE) .................... 10 2013 211 870

(51) Int. Cl.
*B60S 1/52* (2006.01)
*B60S 1/48* (2006.01)
*B60S 1/46* (2006.01)

(52) U.S. Cl.
CPC ................ *B60S 1/52* (2013.01); *B60S 1/487* (2013.01); *B60S 1/488* (2013.01); *B60S 1/46* (2013.01)

(58) Field of Classification Search
CPC .... B60S 1/488; B60S 1/46; B60S 1/52; B60S 1/487; B60S 1/50; B60S 1/522; B60S 1/524
USPC ...... 239/284.1, 133–135, 130, 131; 439/484, 439/486, 487
See application file for complete search history.

(56) References Cited

U.S. PATENT DOCUMENTS

| | | | |
|---|---|---|---|
| 4,088,269 A * | 5/1978 | Schlick | B05B 1/24 137/341 |
| 4,212,425 A | 7/1980 | Schlick | |
| 4,588,546 A * | 5/1986 | Feil | B29C 47/02 156/244.12 |
| 5,634,597 A | 6/1997 | Krohn | |
| 6,094,772 A * | 8/2000 | West | B60S 1/3415 15/250.04 |
| 6,155,299 A | 12/2000 | Martin | |
| 6,501,907 B1 * | 12/2002 | Rehs | B60S 1/52 239/133 |
| 7,371,092 B2 * | 5/2008 | Okumura | H01R 13/5205 439/205 |
| 8,071,251 B2 | 12/2011 | Eshraghi | |
| 8,178,782 B2 | 5/2012 | Kamel | |
| 9,010,661 B2 | 4/2015 | Kim | |

(Continued)

FOREIGN PATENT DOCUMENTS

| | | |
|---|---|---|
| DE | 2456471 | 6/1976 |
| DE | 10338097 A1 | 3/2005 |

(Continued)

*Primary Examiner* — Alexander Valvis
(74) *Attorney, Agent, or Firm* — RatnerPrestia

(57) ABSTRACT

In a washer nozzle for a windshield washer system of a motor vehicle with a heating element held in a duct, a sealing compound for holding the heating element and a sealing element are manufactured from different materials and spaced apart from one another. Consequently, the sealing element may be manufactured from a material having poor heat conduction and the sealing compound from a material having good heat conduction. The washer nozzle has an especially long service life.

9 Claims, 2 Drawing Sheets

(56) References Cited

U.S. PATENT DOCUMENTS

| | | | |
|---|---|---|---|
| 2007/0057472 A1 | 3/2007 | Hatch | |
| 2008/0017415 A1 | 1/2008 | Suter | |
| 2009/0183778 A1* | 7/2009 | Wildegger | B60S 1/487 137/13 |
| 2009/0218414 A1* | 9/2009 | Arkasjevski | B05B 9/002 239/13 |
| 2014/0042243 A1* | 2/2014 | Kim | B60S 1/52 239/130 |

FOREIGN PATENT DOCUMENTS

| | | | |
|---|---|---|---|
| DE | 102005035893 | 2/2007 | |
| DE | 102007005130 * | 8/2007 | B05B 1/24 |
| DE | 102007005130 A1 | 8/2008 | |
| DE | 102012024588 | 6/2014 | |
| EP | 0123103 A2 | 10/1984 | |
| JP | 2013158143 | 8/2013 | |
| RU | 2085420 | 7/1997 | |
| RU | 2106989 | 3/1998 | |

\* cited by examiner

WASHER NOZZLE FOR WINDSHIELD WASHER SYSTEM OF A MOTOR VEHICLE

FIELD OF THE INVENTION

The present invention pertains to a washer nozzle for a windshield washer system of a motor vehicle with a housing, which is provided for fastening to an adjacent component of the motor vehicle, with a washer fluid conduit arranged in the housing for guiding the washer fluid, with a duct arranged in the housing and with a heating element arranged in the duct, with electrical cables led into the duct to the heating element and with a sealing compound for holding the heating element in the duct.

BACKGROUND OF THE INVENTION

Such washer nozzles are used in today's motor vehicles for cleaning a front or rear windshield or the lenses of headlights and are well known from practice. In the prior-art washer nozzle the sealing compound has the task of filling in the gap between the heating element and the housing for direct heat transmission, fixing and protecting the heating element. Furthermore, the sealing compound must seal and insulate the heating element. Consequently, the contact points of the electrical cables at the heating element are protected from environmental effects such as moisture, dirt and salts.

However, a drawback of the prior-art washer nozzle is that the electrical cables, sealing compound and housing have different coefficients of expansion, such that gaps may form between the housing and sealing compound and between the electrical cables and sealing compound after some time. Via these gaps, moisture may penetrate and damage the heating element or its contact with the electrical cables. This leads to a short service life of the washer nozzle.

SUMMARY OF THE INVENTION

An aspect of the present invention is to perfect a washer nozzle of the type mentioned in the introduction, such that it has an especially long service life.

This aspect is accomplished according to the present invention by a sealing element sealing insulators of the cables with the duct and by the sealing element and the sealing compound being components separated from one another.

By means of this design, the different tasks for fixing, heat transmission and sealing of the heating element are divided between the separate components, sealing element and sealing compound. The sealing compound can be selected exclusively according to the intended heat conductivity and the desired strength for supporting the heating element. The tightness of the electrical cables as well as the housing tightness and thus the sealing of the heating element are generated by the sealing element, whose material can be exclusively selected according to the desired elasticity. The sealing element can therefore be manufactured from a permanently elastic material such as silicon, which has poor heat conduction but is cost-effective.

According to another advantageous variant of the present invention, it contributes to simplifying the mounting of the heating element in the duct when the sealing element is spaced apart from the sealing compound. By means of this design, the sealing compound can be fed into the duct and the heating element with the electrical cables and the sealing element can be inserted into the duct. The heating element is pressed into the sealing compound hereby and is reliably held in the duct after hardening. The distance of the sealing compound from the sealing element ensures that the heating element can be inserted into the intended position in the duct, without the abutting of the sealing element against the sealing compound preventing the insertion. Moreover, an unnecessary heating up of the sealing element is consequently avoided.

According to another advantageous variant of the present invention, the duct is especially reliably sealed when the sealing element is prestressed radially against the inner wall of the duct.

According to another advantageous variant of the present invention, the mounting of the sealing element is designed in an especially simple manner when the sealing element is crimped with the insulators of the electrical conductors.

Reliable sealing of the electrical conductors can be guaranteed according to another advantageous variant of the present invention when the insulators of the electrical conductors are extrusion-coated by the sealing element. By means of extrusion-coating, the sealing element can be manufactured in an especially simple manner. The sealing element can be connected with the insulators in substance, frictionally or in a positive-locking manner here.

The tightness of the duct can be permanently guaranteed even in case of temperature variations according to another advantageous variant of the present invention when the sealing element is manufactured from a permanently elastic material.

According to another advantageous variant of the present invention, the heat generated by the heating element can be transmitted to the washer fluid in an especially low-loss manner when the housing has a receptacle for a nozzle element and a washer fluid conduit leading to the receptacle, and that the duct is led up to directly in front of the abutting area of the receptacle and of the washer fluid conduit.

According to another advantageous variant of the present invention, it contributes to the further improvement of the heat transmission when the receptacle and the washer fluid conduit are arranged at an angle to one another.

BRIEF DESCRIPTION OF THE DRAWINGS

The present invention permits numerous embodiments. For further illustration of its basic principle, one of them is shown in the drawing and is described below. In the drawing.

DETAILED DESCRIPTION OF THE PREFERRED EMBODIMENTS

Figure 1:
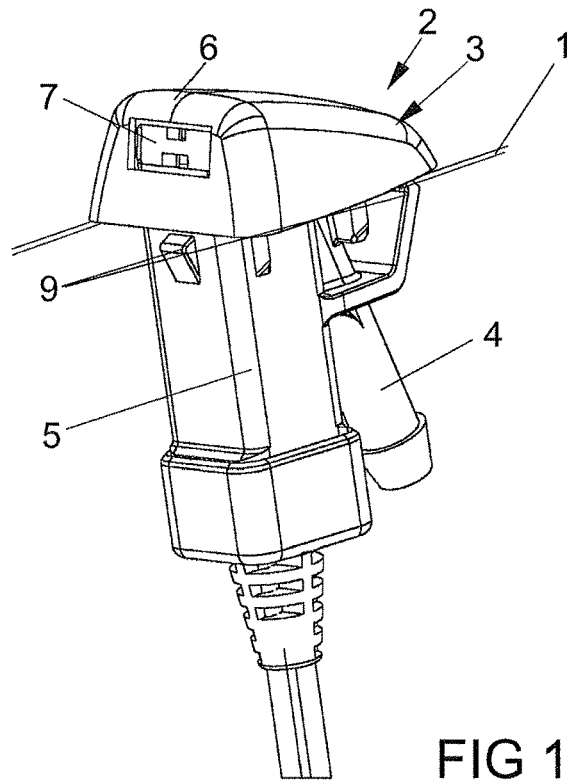
FIG. 1 shows a washer nozzle according to the present invention.

FIG. 1 shows a washer nozzle 2 with a housing 3 mounted on a sheet metal 1 of a motor vehicle. The housing 3 has a connection adapter 4, a shaft 5 and a head 6. A nozzle element 7 is arranged in the head 6 of the housing 3. Electrical cables 8 lead into the shaft 5. A plurality of locking hooks 9 are arranged directly below the head 6 and are used for fastening the washer nozzle 2 to the sheet metal 1 of the motor vehicle. The sheet metal 1 is clamped between the head 6 of the washer nozzle 2 and the locking hooks 9.

Figure 2:
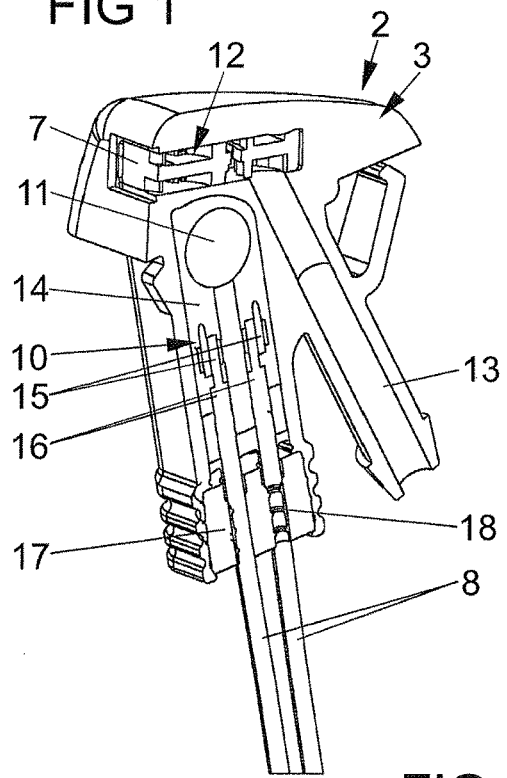
FIG. 2 shows a sectional view through a first embodiment of the washer nozzle from FIG. 1.

FIG. 2 shows in a longitudinal section through a first embodiment of the washer nozzle 2 from FIG. 1 that the housing 3 has a duct 10 led up to close to the sealing element. A heating element 11 is fastened in the duct 10. The housing 3 has a receptacle 12 for holding the nozzle element 7. The connection adapter 4 has a washer fluid conduit 13 led up to the receptacle 12. The washer fluid conduit 13 and the receptacle 12 are bent at an angle to one another. The duct 10 with the heating element 11 is led up to in the abutting corner area of the receptacle 12 and of the washer fluid conduit 13.

The electrical cables 8 are led up to the heating element 11 and supply this heating element with electric current. The heating element 11 is held in the duct 10 by means of a sealing compound 14. In addition, the sealing compound 14 surrounds the contact points 15 of the heating element 11 with the electrical cables 8 and is essentially used for the mechanical holding of the heating element 11, heat conduction and sealing of the contact points 15. The electrical cables 8 have insulators 16 led up to the sealing compound 14. In addition, the electrical cables 8 are held in the housing 3 by means of a sealing element 17. The sealing element 17 is spaced apart from the sealing compound 14 and is manufactured from a permanently elastic material with poor heat conduction. In this embodiment, the sealing element 17 is pressed into the duct 10 and is crimped with the electrical cables 8. The sealing element 17 has ribs 18 for increasing the strength of the connection with the insulators 16 of the cables 8.

In practice, the washer nozzle 2 is arranged in front of a windshield or headlight lens of a motor vehicle, not shown. Washer fluid, which is sprayed by the nozzle element 7 onto the windshield or headlight lens, is fed to the nozzle element 7 via the washer fluid conduit 13. The heating element 11, which is supplied with electric current via the electrical cables 8, heats the nozzle element 7 and prevents its freezing. The sealing element 17 protects the duct 10 and thus the heating element 11 and the sealing compound 14 from the penetration of moisture.

Figure 3:
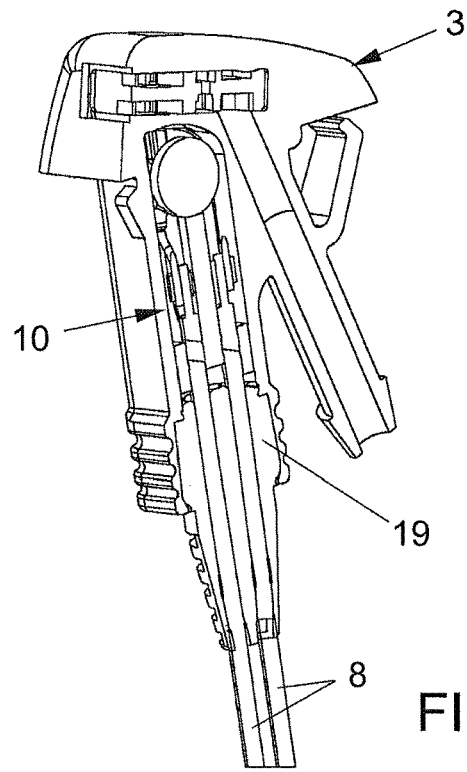
FIG. 3 shows a sectional view through a second embodiment of the washer nozzle.

FIG. 3 shows a sectional view through a second embodiment of the washer nozzle 2, which differs from the embodiment from FIG. 2 only in that the electrical conductors 8 are extrusion-coated in order to generate a sealing element 19 and a protection against buckling of the electrical conductors 8. Otherwise, the washer nozzle 2 is designed like the one from FIG. 2. By means of extrusion-coating, a connection in substance of the sealing element 19 with the electrical cables 8 and/or the duct 10 can be generated.

Figure 4:
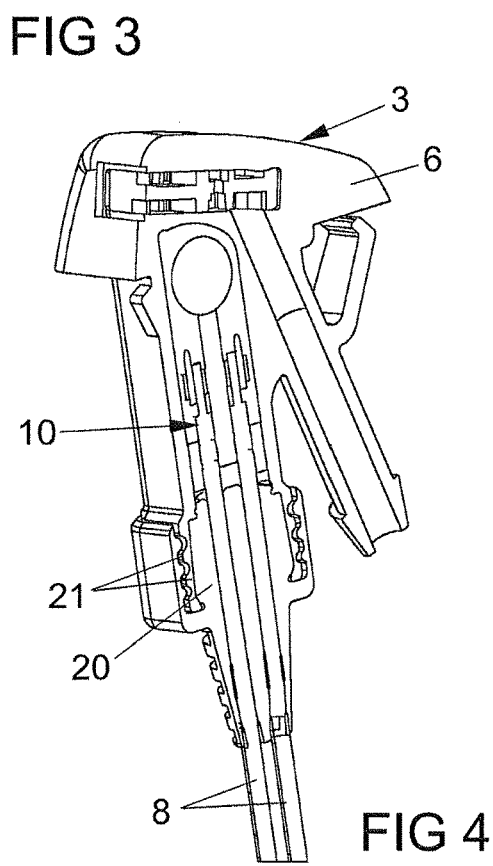
FIG. 4 shows a sectional view through a third embodiment of the washer nozzle.

FIG. 4 shows a sectional view through a third embodiment of the washer nozzle 2, in which the end of the duct 10 facing away from the head 6 and the electrical cables 8 are extrusion-coated for forming a sealing element 20. The duct 10 and the sealing element 20 have corrugations 21 corresponding with one another for increasing the strength of the connection. Otherwise, the washer nozzle 2 is designed like the one from FIG. 2.

The invention claimed is:

1. Washer nozzle for a windshield washer system of a motor vehicle comprising:
    a housing, which is provided for fastening to an adjacent component of the motor vehicle, with a washer fluid conduit arranged in the housing for guiding washer fluid, with a duct arranged in the housing and defined by one or more walls formed by the housing;
    a heating element arranged in the duct, with electrical cables led into the duct to the heating element, the electrical cables including respective insulators;
    a sealing compound for holding the heating element in the duct; and
    a sealing element that seals the insulators of the cables with the duct, the sealing element including a portion surrounding the cables extending outward from the duct beyond an end of the duct;
    wherein the sealing element and the sealing compound are components separated from one another,
    wherein the sealing element and the sealing compound are both components separate from the housing defining the duct,
    wherein the sealing element presses radially outward against the one or more walls of the housing defining the duct to seal the insulators of the cables with the duct, and
    wherein the sealing element includes an additional portion surrounding a region of the housing adjacent the end of the duct.

2. Washer nozzle in accordance with claim 1, wherein the sealing element is spaced apart from the sealing compound.

3. Washer nozzle in accordance with claim 1, wherein the insulators of the electrical cables are extrusion-coated by the sealing element.

4. Washer nozzle in accordance with claim 1, wherein the sealing element is manufactured from an elastic material.

5. Washer nozzle in accordance with claim 1, wherein the housing has a receptacle for a nozzle element and the washer fluid conduit abuts the receptacle, and that the duct is led up to directly in front of an abutting area of the receptacle and of the washer fluid conduit.

6. Washer nozzle in accordance with claim 5, wherein the receptacle and the washer fluid conduit are arranged at an angle to one another.

7. Washer nozzle in accordance with claim 1, wherein the sealing compound surrounds contact points of the heating element with the electrical cables.

8. Washer nozzle in accordance with claim 1, wherein the insulators of the respective electrical cables extend from the sealing element to the sealing compound.

9. Washer nozzle in accordance with claim 1, wherein the region of the housing includes corrugations, and the additional portion is engaged in the corrugations.

* * * * *